(12) United States Patent
Chun

(10) Patent No.: US 7,315,741 B2
(45) Date of Patent: Jan. 1, 2008

(54) HANDOVER PROCESSING METHOD OF MOBILE COMMUNICATION SYSTEM

(75) Inventor: Chang-Hyen Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 10/644,996

(22) Filed: Aug. 21, 2003

(65) Prior Publication Data

US 2004/0038681 A1 Feb. 26, 2004

(30) Foreign Application Priority Data

Aug. 21, 2002 (KR) .................. 10-2002-0049506

(51) Int. Cl.
*H04Q 7/20* (2006.01)
(52) U.S. Cl. ............ 455/436; 455/442; 455/522; 455/434; 370/352
(58) Field of Classification Search ............ 455/442, 455/436, 522, 434; 370/352
See application file for complete search history.

(56) References Cited

U.S. PATENT DOCUMENTS 6,236,860 B1 * 5/2001 Hagting et al. ............ 455/436

2003/0031119 A1 * 2/2003 Kim et al. .................. 370/200
2004/0114574 A1 * 6/2004 Zeira et al. ................. 370/352

OTHER PUBLICATIONS

3GPP TS 25.322 v3.7.0 (Jan. 6, 2001) RLC Protocol Specification (Release 1999), Section 4.2.1.3 and Sections 9-11.6.6.3.
3GPP TS 25.303 V3.12.0 (Feb. 6, 2002) RRR Call Flow Specification (Release 1999), Sections 6.4.1-6.4.7.
3GPP TS 25.331 v3.11.0 (Feb. 6, 2002) Radio Resource Control Protocol Specification (Release 1999).

* cited by examiner

*Primary Examiner*—Joseph Feild
*Assistant Examiner*—Pierre-Louis Desir
(74) *Attorney, Agent, or Firm*—Birch, Stewart, Kolasch & Birch, LLP

(57) ABSTRACT

In a handover processing method of a mobile communication system, when a radio link set (active set update) message is received from a RNC (radio network controller), the method includes performing a backup of a present radio link set and changing the present radio link set according to the radio link set message; operating a timer when the radio link set is changed and transmitting a radio link set completion (active set update complete) message to the RNC; and reverting the changed radio link set back to the previous backed-up radio link set when a reply signal is not received from the RNC even though the operation time of the timer expires.

20 Claims, 5 Drawing Sheets

HANDOVER PROCESSING METHOD OF MOBILE COMMUNICATION SYSTEM

The present application claims, under 35 U.S.C. § 119, the priority benefit of Korean Patent Application No. 49506/2002 filed on Aug. 21, 2002, the entire contents of which are herein fully incorporated by reference.

BACKGROUND OF THE INVENTION

1. Field of the Invention

The present invention relates to a mobile communication system, and in particular to a method for processing abnormal handover termination in a universal mobile telecommunications system (UMTS).

2. Description of the Background Art

Radio communication for transmitting/receiving data packets or different type of information by using radio contact techniques and cellular type mobile communication techniques is the backbone of information society through far-reaching business use and non-business use applications. Hereinafter, this concept is simply called "mobile communication".

In general, a mobile communication system can be constructed as an analog cellular system, a DCS (digital cellular system), a PCS (personal communication services), a GSM (global system for mobile communications) and an IMT-2000, etc. Herein, these systems use an air interface standard such as a CDMA (code division multiple access), a TDMA (time division multiple access) and a FDMA (frequency division access).

The mobile communication system is classified into a first generation analog type system, a second generation digital type system (2G) and a third generation upgraded digital type system (3G).

Herein, two standards used in the second generation mobile communication system are a GSM system using the TDMA as an air interface technique and a CDMA system using the CDMA as an air interface technique.

In addition, the IMT-2000 or an UMTS (universal mobile telecommunications system) is known as a third generation mobile communication standard. Two standard establishment bodies, namely, 3GPP (third generation partnership project) and 3GPP2 (third generation partnership project two), provide these third generation standards. Various betterment of the standardized second generation mobile communication system are reflected in the third generation standards.

FIG. 1 is a schematic view illustrating a general UMTS.

As depicted in FIG. 1, the UMTS system includes a RNC (radio network controller) 100, plural Node Bs (base stations) 200-1~200-n managed by the RNC 100, and a CN (core network) 300.

The RNC 100 allocates and manages radio resources, and performs circuit exchange communication with the GSM network and packet exchange communication with the GPRS network by being operatively coupled to the CN 300.

The Node Bs 200-1~200-n receive information transmitted from a physical layer of an UE (user equipment) 400 and performs an access point function of the UE 400 transmitting data to another UE 400.

A handover operation in the general UMTS system will be described.

In general, in the mobile communication system, a service region is divided into plural cells. Accordingly, the UE 400 performs communication by setting at least one call while passing an overlap region between adjacent cells.

The RNC 100 transmits parameters necessary to handover determination such as a reporting range, a hysteresis, a time trigger, etc., to the UE 400 by using a RRC (radio resource control) message. Accordingly, the UE 400 receiving the RRC message finds a measurement quantity of communicating cells and a measuring cell, and determines handover by using the received parameters.

In more detail, as depicted in FIG. 2, when a measurement quantity of the very best cell among the cells communicating with the measuring cell is less than the hysteresis, the UE 400 adds a cell (event A: adding Cell 2). When a measurement quantity of the very bad cell among the cells communicating with the measuring cell is greater than the hysteresis, the UE 400 replaces the cell (event C: replacing Cell 1 with Cell 3). When a measurement quantity of the very best cell among the cells communicating with the measuring cell is greater than the hysteresis, the UE 400 removes the cell (event B: removing Cell 3).

Accordingly, as depicted in FIG. 3, a RRC (radio resource control) layer 10 (hereinafter referred to as a RRC) of the UE 400 analyzes the measurement quantity found at the physical layer of the UE 400 and checks whether the pertinent measurement quantity satisfies the above-described event condition for handover.

If the event condition for handover is satisfied, the RRC 10 of the UE 400 requests a measurement report message transmission to a RLC (radio link control) layer 20 (hereinafter referred to as a RLC) of the UE 400. The RLC 20 receiving the measurement report message transmission request transmits a measurement report message to the RNC 100 by using an AM (acknowledge mode) method.

When the measurement report message is received, the RNC 100 transmits a reply signal (RLC_ACK) for indicating normal reception of the measurement report message to the RLC 20 and analyzes the measurement report message. As a result of this analysis, if it is judged that the event condition for handover is satisfied normally, the RNC 100 transmits an active set update message as a handover approval message to the RLC 20 of the UE 400, and accordingly the handover procedure starts.

The RRC 10 performs the handover by processing the active set update message received through the RLC 20. When a radio link setting of the UE 400 is normally adjusted (added or deleted) through the handover, the RNC 100 requests an AM type transmission of an active set update complete message to the RLC 20. Accordingly, the RLC 20 transmits the active set update complete message to the RNC 100 according to the request of the RRC 10 and waits for a certain time duration until a RLC_ACK (reply signal) is received from the RNC 100.

In the meantime, the RNC 100 completes the handover procedure by performing an additional handover setting according to the active set update complete message transmitted from the RLC 20 and transmits the RLC_ACK to the RLC 20.

However, when the RLC_ACK from the RNC 100 is not received by the RLC 20 after the certain time has elapsed, the RLC 20 retransmits the active set update complete message to the RNC 100 in order to receive the RLC_ACK from the RNC 100. Afterward, when the RLC_ACK is received from the RNC 100, the RLC 20 transmits to the RRC 10 a confirmation signal indicating that it performed the active set update complete message transmission properly. Accordingly the RRC 10 completes the handover procedure properly.

However, in the conventional handover method, when the RLC_ACK is not transmitted from the RNC to the RLC due to an error occurrence in a down-link channel, the RLC cannot transmit to the RRC a needed confirmation signal indicating that it performed properly the active set update complete message transmission. Thus, without the receipt of the confirmation signal from the RLC, the RRC cannot complete the handover procedure properly. Accordingly, problems such as call interruptions in communications occur.

SUMMARY OF THE INVENTION

In order to solve the above-mentioned and other problems, it is an object of the present invention to provide a handover processing method for a mobile communication system appropriate to the radio link set processing in handover operations.

It is another object of the present invention to provide a handover processing method for a mobile communication system, which is capable of preventing or managing an abnormal handover procedure termination occurrence in a user equipment.

In order to achieve the above-mentioned and other objects, a handover processing method for a mobile communication system in accordance with an embodiment of the present invention includes: requesting a radio link set (active set update) to a RNC; performing a backup of a present radio link set and changing the present radio link set when the radio link set request is approved; transmitting a radio link set completion (active set update complete) message to the RNC; checking whether a reply signal (RLC_ACK) is received; and returning the changed radio link set to the previous backup radio link set when the reply signal is not received from the RNC for a certain time.

In order to achieve the above-mentioned and other objects, a handover processing method for a mobile communication system in accordance with an embodiment of the present invention includes: starting a handover procedure; requesting a radio link set (active set update) to a RNC when the handover procedure starts; performing a backup of a present radio link set and changing the present radio link set when the radio link set request is approved; operating a first timer; transmitting a radio link set completion (active set update complete) message to the RNC and waiting a reply signal (RLC_ACK); returning the changed radio link set to the previous backup radio link set when the reply signal is not received and the first timer has expired; and finishing the handover procedure.

In order to achieve the above-mentioned and other objects, a handover processing method for a mobile communication system in accordance with an embodiment of the present invention includes: requesting a radio link set (active set update) to a RNC; performing a backup of a present radio link set when the radio link set request is approved; changing the present radio link set and operating a first timer; transmitting a radio link set completion (active set update complete) message to the RNC and operating a second timer; checking whether a reply signal (RLC_ACK) is received from the RNC; retransmitting the radio link set completion message when the reply signal is not received and the second timer expires; and returning the changed radio link set to the previous backup radio link set when the reply signal is not received and the first timer expires.

The present invention is also directed to setting an operation time of the first timer so as to be the same with or greater than the sum of the operation time of the second timer and the retransmission time.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, the preferred embodiments of the present invention will be described referring to the figures.

Figure 1:
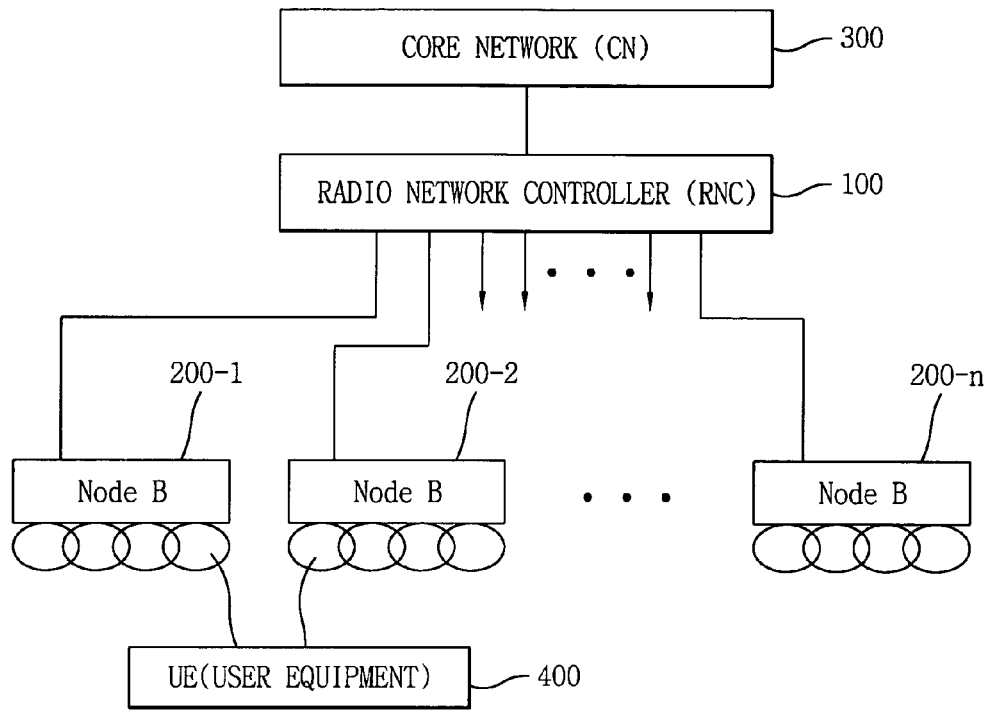
FIG. 1 is a schematic view illustrating a general UMTS (universal mobile telecommunications system)
Figure 2:
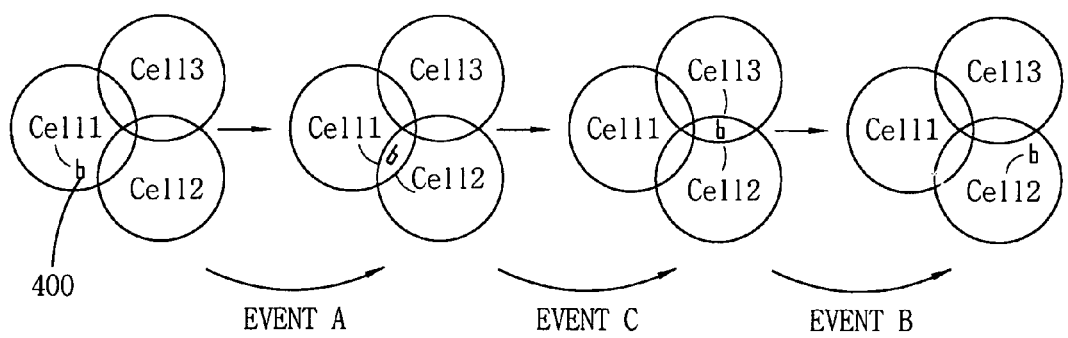
FIG. 2 is a conceptual view illustrating a handover determining process by measuring a measurement quantity of a cell in FIG. 1.
Figure 3:
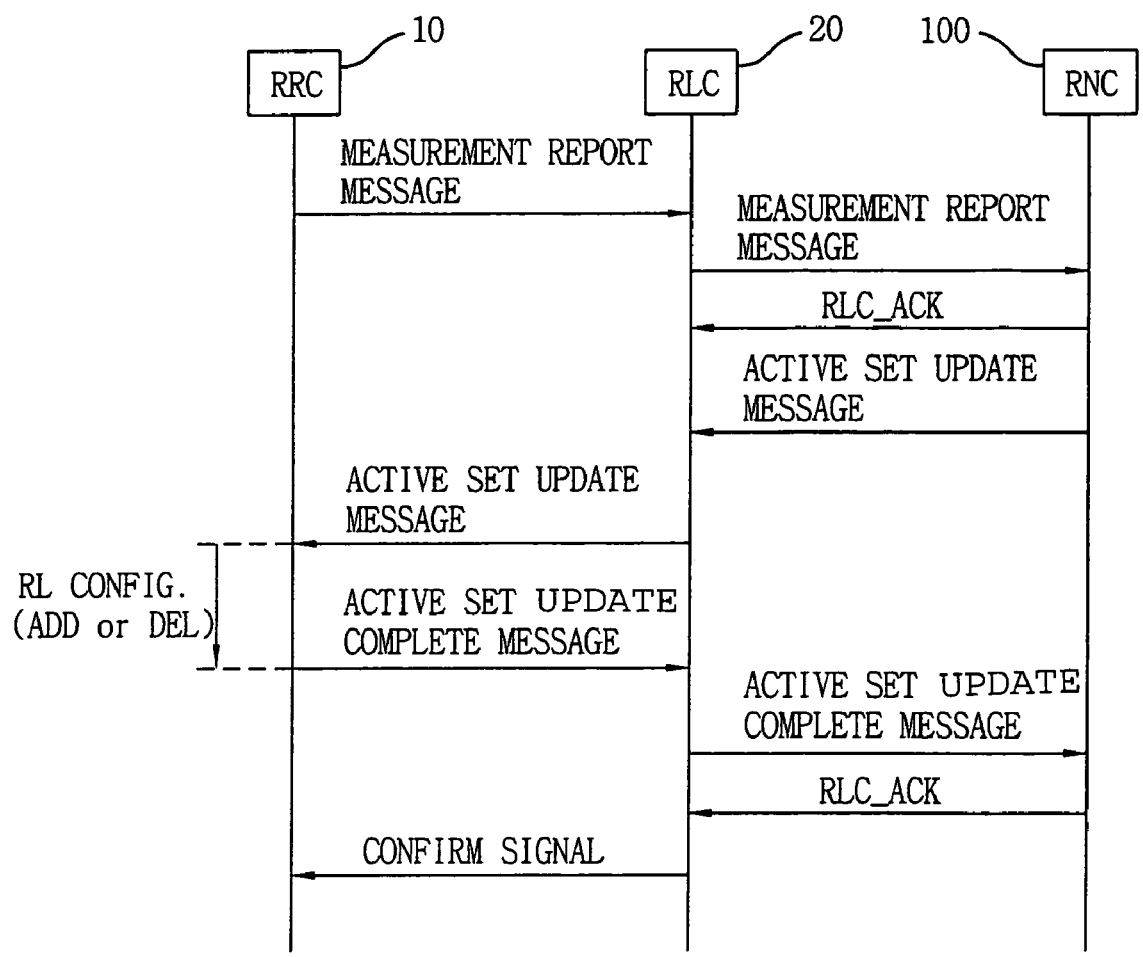
FIG. 3 is a message flow chart illustrating a general handover processing method of the UMTS system in FIG. 1.

A handover processing method of a mobile communication system in accordance with an embodiment of the present invention is implementable in a general UMTS (universal mobile telecommunications system) system depicted in FIG. 1 or in other suitable systems.

In the present invention, the handover processing method prevents the occurrence of any abnormal handover procedure termination of a UE (user equipment) by applying a timer to a RRC (radio resource control) of the UE.

Figure 4:
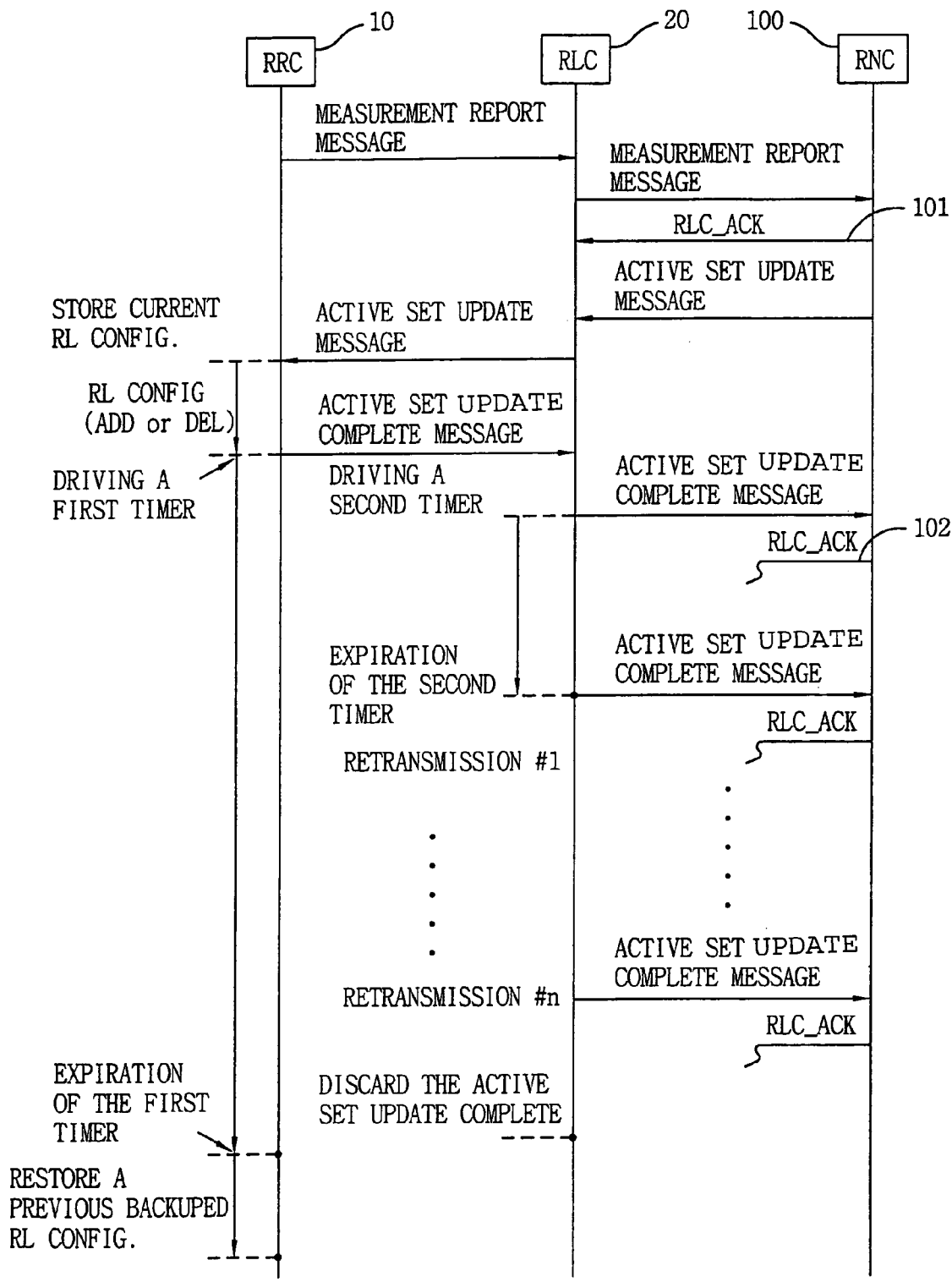
FIG. 4 is a message flow diagram illustrating a handover processing method of a mobile communication system in accordance with an embodiment of the present invention.
Figure 5:
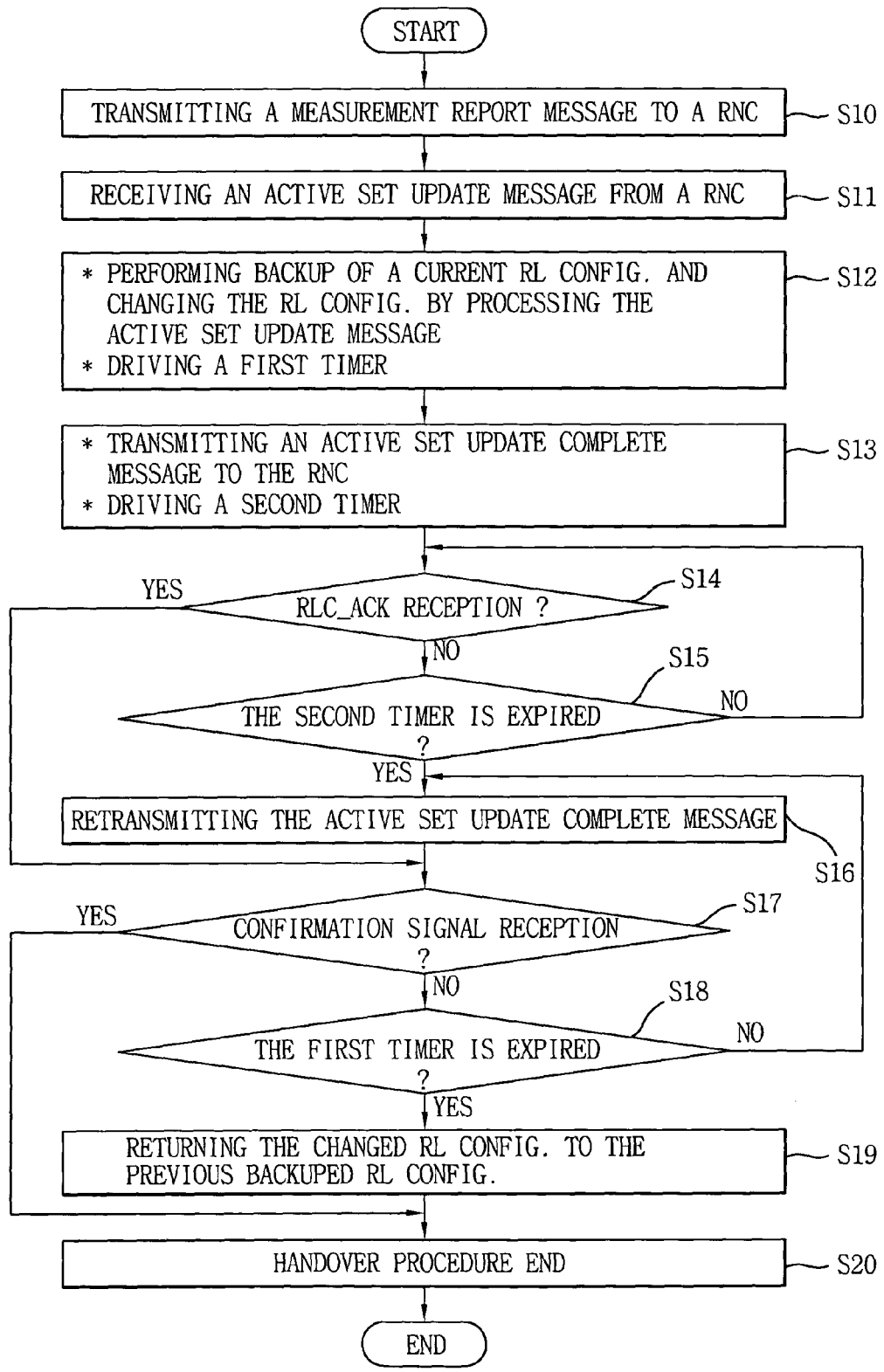
FIG. 5 is a detailed flow chart illustrating an operation of the handover processing method according to the message flow in FIG. 4.

FIG. 4 is a signal flow diagram illustrating a handover processing method of a mobile communication system in accordance with an embodiment of the present invention, and FIG. 5 is a flow chart illustrating a detailed operation of the handover processing method in FIG. 4. As discussed above, the processing steps of FIGS. 4-5 are implementable in the UMTS system shown in FIG. 1.

As depicted in FIGS. 4 and 5, a RRC (radio resource control layer) 10 of a UE (user equipment) transmits a measurement report message to a RNC (radio network control) 100 through a RLC (radio link control layer) 20 of the UE. The RLC 20 receives a RLC_ACK signal 101 acknowledging the receipt of the measurement report message and a radio link set (active set update) message from the RNC 100. The RRC 10 receives the radio link set message from the RLC 20 as shown at steps S10 and S11.

When the radio link set message is transmitted from the RNC 100 through the RLC 20, the RRC 10 backups a present radio link set at a physical layer and adjusts (e.g., adds or deletes) the pertinent radio link set according to the received radio link set message. When the radio link set of the UE 400 is completed, the RRC 10 operates a first timer as shown at step S12.

Afterward, the RRC 10 requests a radio link set completion (active set update complete) message transmission to the RLC 20. The RLC 20 then transmits the requested radio link set completion message to the RNC 100 by an AM method, operates a second timer, and checks for a certain time duration whether or not a reply signal 102 (RLC_ACK) for acknowledging the receipt of the radio link set completion message is received from the RNC 100 as shown at steps S13~S15. Herein, the RNC 100 is configured to complete the handover processing by performing the additional handover set according to the received radio link set completion message transmitted from the RLC 20 and to transmit the reply signal 102 (RLC_ACK) to the RLC 20.

When the reply signal 102 (RLC_ACK) is not transmitted from the RNC 100 to the RLC 20 even though the second timer has expired, the RLC 20 retransmits the radio link set completion message to the RNC 100 in order to receive the reply signal 102 (RLC_ACK) as shown at step S16. The RLC 20 performs any number of the retransmission before the first timer expires, if it has not received the reply signal 102 (RLC_ACK) before the first timer expires, but if the first timer expires, then the process proceeds to step S19 discussed later.

If the reply signal 102 (RLC_ACK) is not transmitted from the RNC 100 to the RLC 20, the RLC 20 cannot transmit a confirmation signal (indicating the radio link set completion message is transmitted to the RNC 100 normally) to the RRC 10.

At step S17, if the confirmation signal indicating that the radio link set completion message is transmitted to the RNC 100 normally is not received from the RLC 20, then it is determined if the first timer has expired at step S18. Herein, the operation time of the first timer is the same as or greater than the sum of the operation time of the second timer and the total retransmission time.

At step S18, when the confirmation signal is not transmitted from the RLC 20 even though the first timer has expired, the RRC 10 reverts the radio link set back to the backup (or previous) radio link set (i.e., replaces the changed radio link set with the backed-up previous radio link set) at step S19, and finishes the handover processing at step S20.

When the RLC_ACK 102 is received during the operation time of the first and second timers or the retransmission, the RRC 10 finishes the handover procedure after the reception of the RLC_ACK 102.

In accordance with the above-discussed embodiment of the present invention, the radio link set return operation at step S19 is managed by checking the confirmation signal reception. However, because the confirmation signal is generated on the basis of the reply signal 102 (RLC_ACK) reception, in accordance with another embodiment it is possible to manage the return operation directly in the UE 400 by checking whether the reply signal 102 (RLC_ACK) is received during the operation time of the first timer. This operation will be described in more detail with reference to accompanying FIG. 6. The processing steps of FIG. 6 are implementable in the system of FIG. 1.

Herein, the RRC 10 and the RLC 20 are included in the UE 400, and each operation of the RRC 10 and the RLC 20 is described as an operation of the UE 400.

Figure 6:
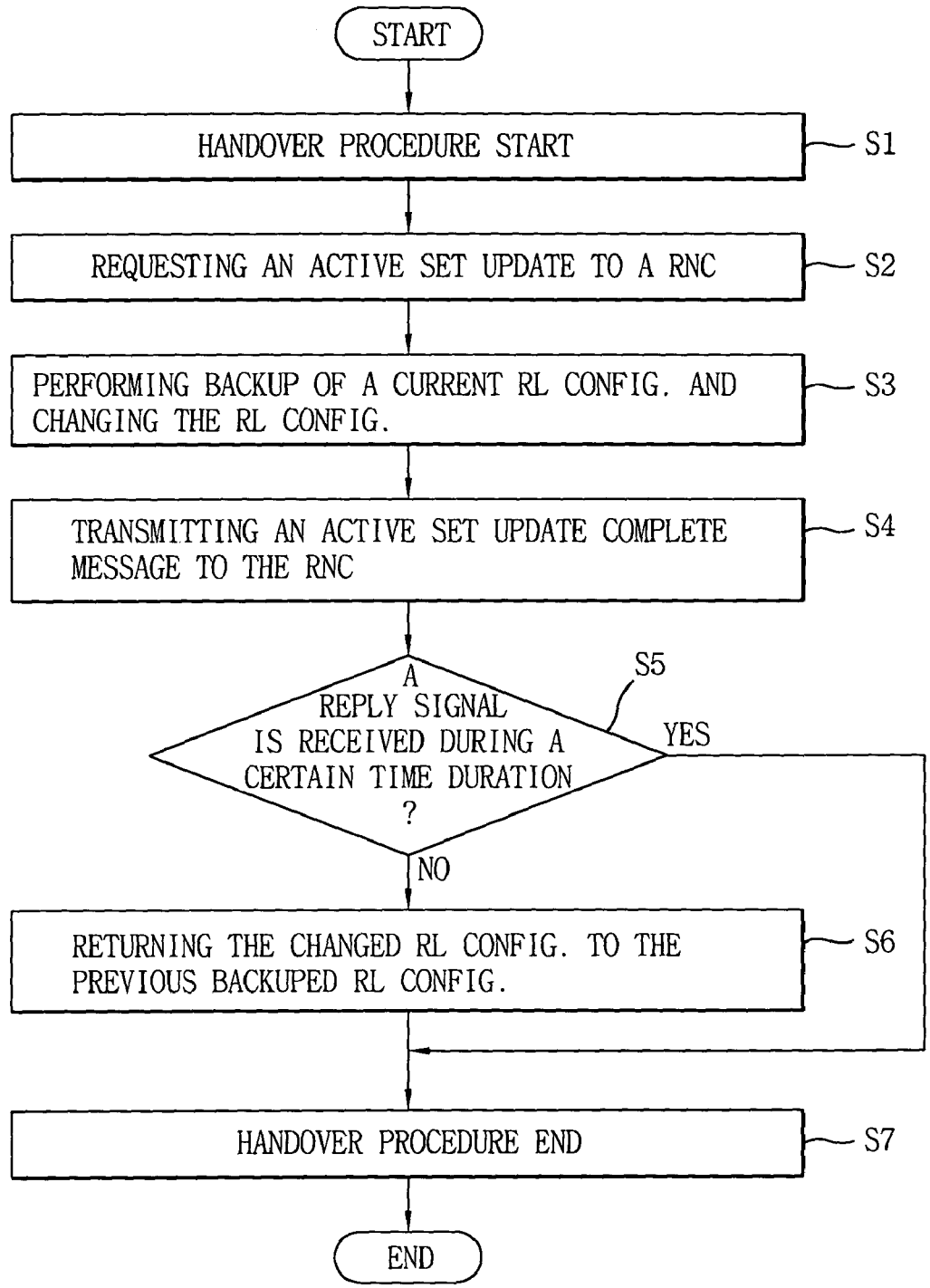
FIG. 6 is a flow chart illustrating a handover processing method of a mobile communication system in accordance with another embodiment of the present invention.

Referring to FIG. 6, when the handover procedure starts as shown at step S1, the UE 400 determines the handover by using a message transmitted from the RNC 100 and requests a radio link set by transmitting a measurement report message to the RNC 100 as shown at step S2.

The RNC 100 analyzes the measurement report message transmitted from the UE 400 and transmits a radio link set (active set update) message as a handover approval message to the UE 400.

When the radio link set message is received, the UE 400 backups the present radio link set of a physical layer and changes the radio link set according to the received radio link set message as shown at step S3.

When the radio link set is changed, the UE 400 transmits a radio link set completion (active set update complete) message for indicating the radio link adjustment completion to the RNC 100 as shown at step S4, and checks whether a reply signal (RLC_ACK) about the radio link set completion message is transmitted from the RNC 100 during a certain time duration as shown at step S5. Before this time duration expires, if no reply signal is received, the radio link set completion message may be retransmitted for any number of times as needed to receive the reply signal.

As a result of the checking at step S5, when the reply signal is not received, the UE 400 reverts back to the previous backup radio link set (i.e., replaces the changed radio link set with the backed-up previous radio link set) and finishes the handover processing at steps S6 and S7. On the contrary, in step S5, when the reply signal is transmitted from the RNC 100, the UE 400 finishes the handover processing right after the reception of the reply signal.

In the present invention, to meet the convenience of description, the UMTS system is served as an example; however, the above-described embodiments are not limited by that and have the same advantages and application to systems according to W-CDMA standard or other suitable systems.

As described above, in the present invention, when a confirmation signal about a radio link set completion message is not received and the handover processing is not normally finished in a UE (user terminal), by processing the abnormal handover procedure according to the present invention in the UE, it is possible to prevent communication from being interrupted by the abnormal handover processing.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A handover processing method for a mobile communication system, the method comprising:
    requesting a radio link set to a radio network controller (RNC);
    performing a backup of a present radio link set and changing the present radio link set, when the radio link set request is provided;
    driving a first timer for counting a first time duration;
    transmitting a radio link set completion message to the RNC;
    driving a second timer for counting a second time duration;

checking whether a reply signal in response to the radio link set completion message is received;

checking whether the reply signal is received within the second time duration that is shorter than the first time duration;

retransmitting the radio link set completion message when the reply signal is not received within the second time duration; and reverting the changed radio link set back to the previous backed-up radio link set when the reply signal is not received and both of the first and second periods of time have expired.

2. The method of claim 1, wherein the reverting step further includes:

checking whether the reply signal is received within the first time duration after the retransmitting step; and reverting the radio link set to the backed-up radio link set when the reply signal is not received within the first time duration.

3. The method of claim 2, wherein the first time duration is the same as or greater than a sum of the second time duration and the retransmission time.

4. A handover processing method for a mobile communication system, the method comprising:

starting a handover procedure;

requesting a radio link set to a radio network controller (RNC) when the handover procedure starts;

performing a backup of a present radio link set and changing the present radio link set when the radio link set request is approved;

operating a first timer for counting a first period of time after the changing step;

transmitting a radio link set completion message to the RNC and waiting for a reply signal in response to the radio link set completion message;

operating a second timer to count a second period of time that is shorter than the first period of time;

retransmitting the radio link set completion message when the reply signal is not received in the second period of time;

reverting the changed radio link set back to the previous backed-up radio link set when the reply signal is not received and both of the first and second periods of time have expired; and finishing the handover procedure.

5. The method of claim 4, wherein, if the reply signal is received before the first period of time expires, the finishing step is performed by bypassing the reverting step.

6. The method of claim 4, wherein the first timer is operated at a RRC (radio resource control) layer of a user equipment.

7. The method of claim 4, wherein the second timer is operated at a radio link control (RLC) layer of a user equipment.

8. The method of claim 4, wherein the first period of time is the same as or greater than a sum of the second period of time and the retransmission time.

9. A handover processing method for a mobile communication system, the method comprising:

requesting a radio link set to a radio network controller (RNC);

performing a backup of a present radio link set when the radio link set request is approved;

changing the present radio link set and operating a first timer to count a fist period of time;

transmitting a radio link set completion message to the RNC and operating a second timer to count a second period of time that is shorter than the first period of time;

checking whether a reply signal in response to the radio link set completion message is received from the RNC;

retransmitting the radio link set completion message when the reply signal is not received and the second time period has expired; and reverting the changed radio link set back to the backed-up radio link set when the reply signal is not received and both of the first and second periods of time have expired.

10. The method of claim 9, wherein when the reply signal is received during the first or second time periods, the reverting step is bypassed and the handover processing is completed.

11. The method of claim 9, wherein the first timer is operated at a radio resource control (RRC) layer of a user device.

12. The method of claim 9, wherein the second timer is operated at a radio link control (RLC) layer of a user device.

13. The method of claim 9, wherein the first time period is the same as or greater than a sum of the second time period and the retransmission time.

14. A method of preventing abnormal handover operation, the method comprising:

modifying a current radio link set at a user device and then transmitting a completion message to a network device;

driving a first timer to count a first time duration;

checking whether a response signal in response to the completion message is received at the user device;

driving a second timer to count a second time duration;

checking whether the response signal is received within the second time duration that is shorter than the first time duration;

retransmitting at least once the completion message to the network device if no response signal is received during the second time duration; and reverting the modified radio link set back to a backed-up radio link set when the reply signal is not received and both of the first and second periods of time have expired.

15. The method of claim 14, wherein, in the checking step, the response signal is an acknowledgment signal from the network device that acknowledges a receipt of the completion message.

16. The method of claim 15, wherein the network device is a radio network controller in a mobile communication system.

17. The method of claim 14, wherein, the checking step, the response signal is a confirmation signal that confirms a receipt of an acknowledgement signal from the network device, the acknowledgment signal acknowledging a receipt of the completion message.

18. The method of claim 14, wherein the first time duration is equal to or greater than a sum of the second time duration and a total retransmission time at the retransmitting step.

19. The method of claim 17, wherein the network device is a radio network controller in a mobile communication system.

20. The method of claim 14, wherein the first and second timers operate at a radio resource control layer of the user device.

* * * * *